(12) United States Patent
Nakagawa et al.

(10) Patent No.: US 7,830,631 B2
(45) Date of Patent: Nov. 9, 2010

(54) CONTROLLING AN OVERSHOOT AMPLITUDE LEVEL BASED ON A RECORDING DATA PATTERN IN A MAGNETIC DISK DRIVE

(75) Inventors: Takeshi Nakagawa, Kanagawa (JP); Yasutaka Nishida, Tokyo (JP); Ikuya Tagawa, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 571 days.

(21) Appl. No.: 11/890,001

(22) Filed: Aug. 3, 2007

(65) Prior Publication Data
US 2008/0043358 A1    Feb. 21, 2008

(30) Foreign Application Priority Data
Aug. 4, 2006  (JP) ............... 2006-213150

(51) Int. Cl.
*G11B 5/09* (2006.01)
(52) U.S. Cl. ............... 360/46; 360/48; 360/68
(58) Field of Classification Search ............. None
See application file for complete search history.

(56) References Cited

U.S. PATENT DOCUMENTS

| 6,826,003 B1 | 11/2004 | Subrahmanyam |
| 6,870,697 B2 | 3/2005 | Ikekame et al. |
| 6,930,846 B2 | 8/2005 | Nakamura |
| 7,126,773 B1 * | 10/2006 | Taratorin ............ 360/46 |
| 7,154,687 B2 * | 12/2006 | Ikekame et al. ........ 360/46 |
| 2002/0135920 A1 | 9/2002 | Aoyagi et al. |
| 2003/0103290 A1 * | 6/2003 | Atsumi ............ 360/75 |
| 2003/0189778 A1 * | 10/2003 | Elliott et al. ........ 360/29 |

FOREIGN PATENT DOCUMENTS

| JP | 2004-030730 | 1/2004 |
| JP | 2005-018833 | 1/2005 |

OTHER PUBLICATIONS

The extended European Search Report corresponding to the Application No. 07012823.6-1232, date of mailing Jan. 23, 2009, 7 pages total.
Muraoka et al., "Nonlinear Transition Shift Measurement in Perpendicular Magnetic Recording," *IEEE Transactions on Magnetics*, vol. 32, No. 5, Part 1, Sep. 1996, pp. 3926-3928.
Senanan et al., "Theoretical Study of Nonlinear Transition Shift in Double-Layerperpendicular Media," *IEEE Transactions on Magnetics*, vol. 38, No. 4, Jul. 2002 pp. 1664-1669.
Zhang et al., "A Theoretical Study of Nonlinear Transition Shift," *IEEE Transactions on Magnetics*, vol. 34, No. 4, Jul. 1998 pp. 1955-1957.

* cited by examiner

*Primary Examiner*—Jason C Olson (57) ABSTRACT

Embodiments of the present invention reduce lowering of a recording current and a recording magnetic field that might occur upon execution of write pre-compensation for compensating the NLTS according to a perpendicular magnetic recording method. According to one embodiment, the recording current overshoot is increased for recording a high NLTS recording data pattern. The read signal quality is improved, thereby a highly reliable magnetic disk can be provided.

12 Claims, 14 Drawing Sheets

Fig.1

--PRIOR ART--

Fig.2

--PRIOR ART--

Fig.3

$$\overset{Tb0}{\cdots 0\,\overset{\rightarrow}{0}\,1\,\overset{\leftarrow}{0}\,\cdots}$$ Recording Data Pattern (NRZL)

$\cdots 0\ 0\ 1\ 1\ \cdots$  Recording Data Pattern (NRZI)

- Without write pre-compensation -

Recording Current

Recording Magnetization
Explanatory Drawing

Tb0 = Tb1 > Tb2 ⇒ The bit length Tb2 on recording magnetization becomes longer than expected bit length Tb0 due to NLTS.

- With write pre-compensation -

Recording Current

Recording Magnetization
Explanatory Drawing

Tb1' > Tb0 = Tb2' ⇒ The bit length Tb1' on a recording current can be set longer beforehand to make it equal to Tb0.

--PRIOR ART--

Fig.4

--PRIOR ART--

Detailed Diagram of the above OSC 1403

CONTROLLING AN OVERSHOOT AMPLITUDE LEVEL BASED ON A RECORDING DATA PATTERN IN A MAGNETIC DISK DRIVE

CROSS-REFERENCE TO RELATED APPLICATION

The instant nonprovisional patent application claims priority to Japanese Patent Application No. 2006-213150 filed Aug. 4, 2006 and which is incorporated by reference in its entirety herein for all purposes.

BACKGROUND OF THE INVENTION

In the case of a perpendicular magnetic recording method, a demagnetizing field in/around the recording layer of a subject medium functions differently from that of the conventional longitudinal recording method due to the magnetization recorded in the recording layer of the medium. Consequently, the demagnetizing field generated from the previous magnetization or the like also comes to affect a magnetic field (recording magnetic field) generated from the recording head differently from that of the longitudinal magnetic recording method. Hereunder, a description will be made for the measures to be taken for such a difference in the ways of influence between those two methods and problems that arise from the measures by picking up an NLTS (Non-Linear Transition Shift) in which the influence difference appears remarkably.

Figure 1:
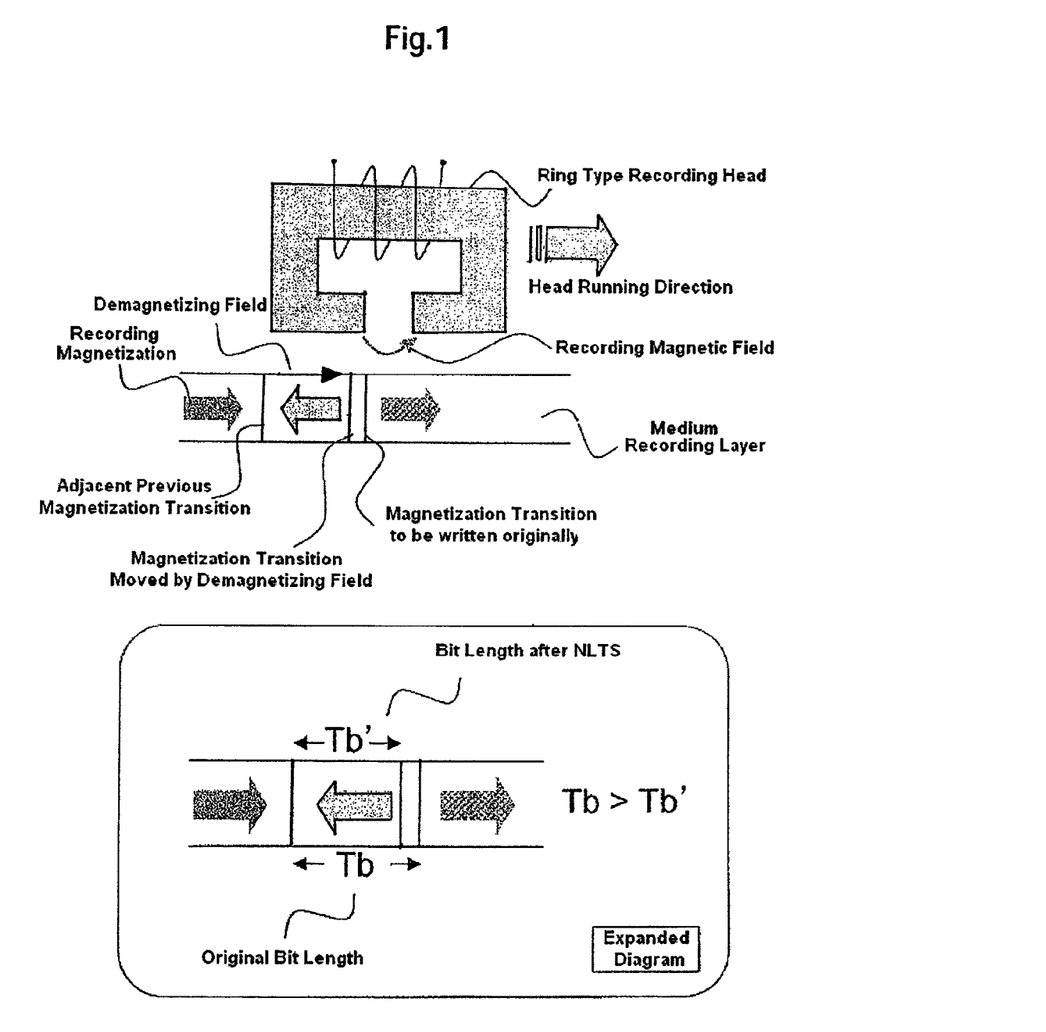
FIG. 1 is a vertical cross sectional diagram of an NLST generation mechanism according to the longitudinal magnetic recording method.
Figure 2:
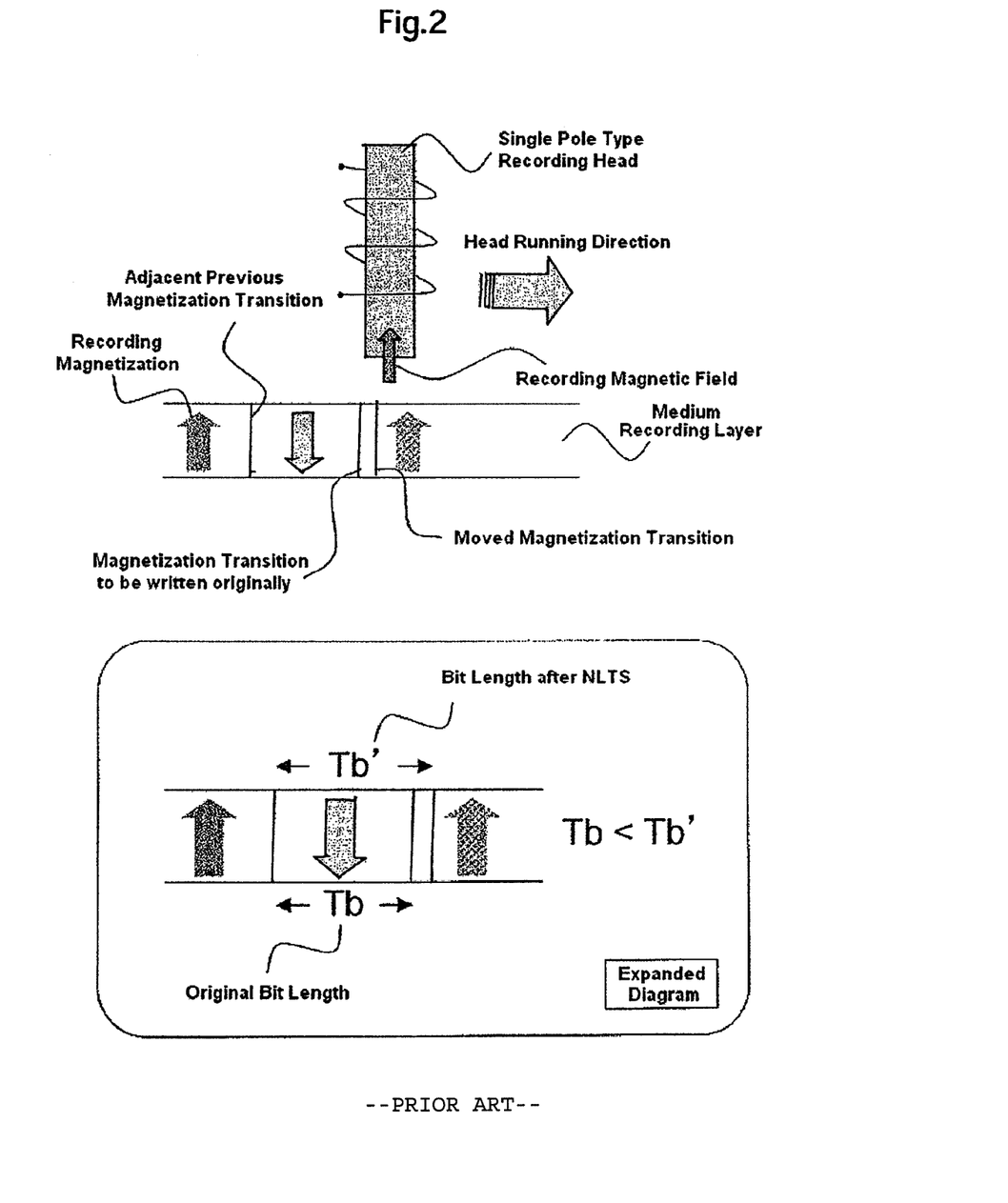
FIG. 2 is a vertical cross sectional diagram of an NLST generation mechanism according to the perpendicular magnetic recording method.

The NLTS is a phenomenon in which a demagnetizing field generated from the previous magnetization strengthens or weakens a recording magnetic field, thereby magnetization transition appears before or after the position at which the magnetization transition is to appear originally. As described in "IEEE Trans. Magn., 34, 1955 (1998)", it is well known that in the case of the longitudinal magnetic recording method, the NLTS shifts magnetization transition that is about to occur forward from the position at which the magnetization transition is to occur originally due to the adjacent previous magnetization transition, thereby the bit length to be recorded on the subject medium is shortened than the original length (FIG. 1). On the other hand, each of the "IEEE Trans. Magn., 32, 3926 (1996) and the "IEEE Trans. Magn., 38, 1664 (2002)" reports that in the case of the perpendicular magnetic recording method, the NLTS shifts magnetization transition backward from the position at which the magnetization transition is to occur originally due to the adjacent previous magnetization transition, thereby the bit length becomes longer (FIG. 2).

Figure 3:
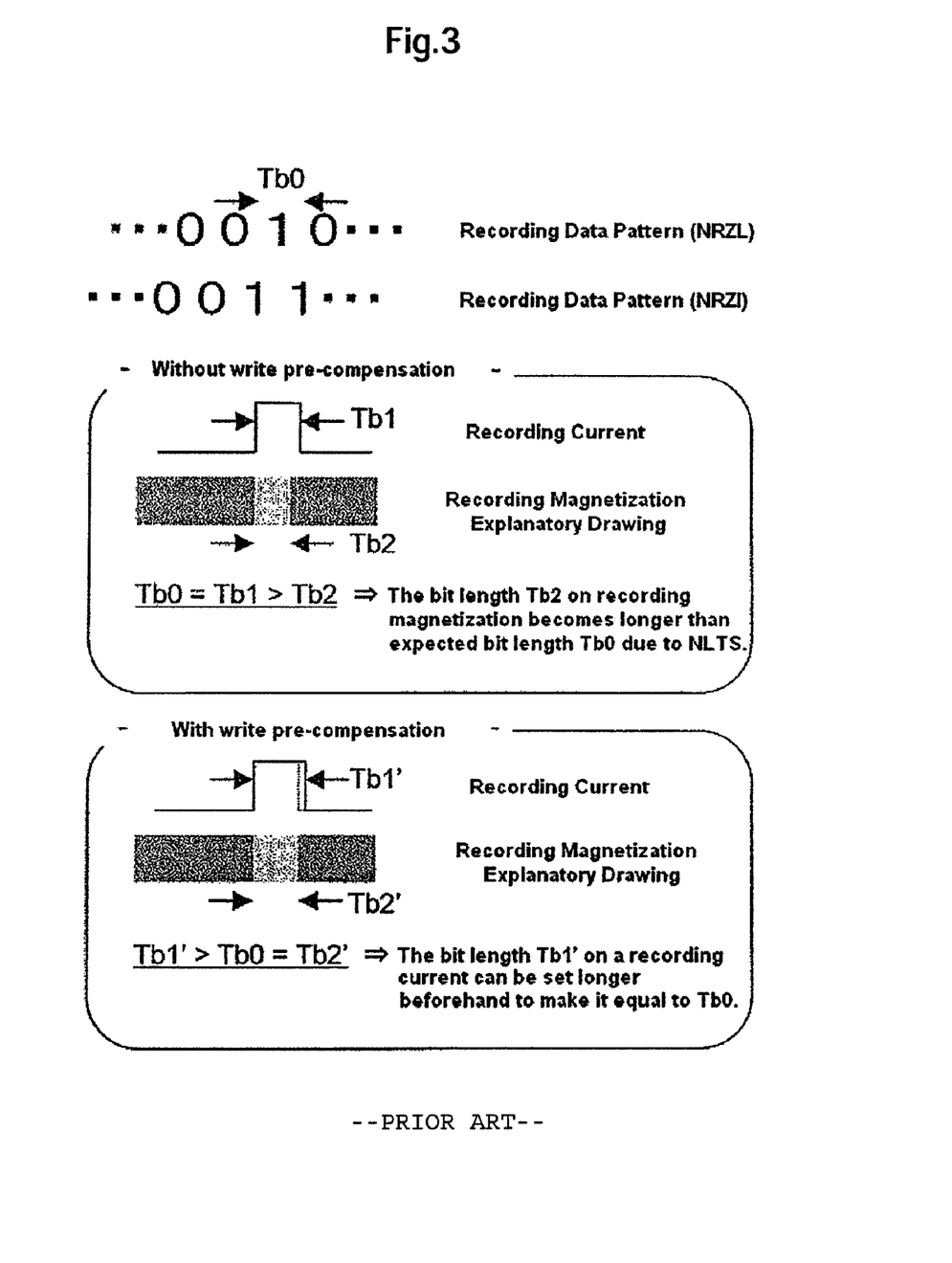
FIG. 3 is an explanatory diagram for showing the write pre-compensation method and its effect according to the longitudinal magnetic recording method.
Figure 4:
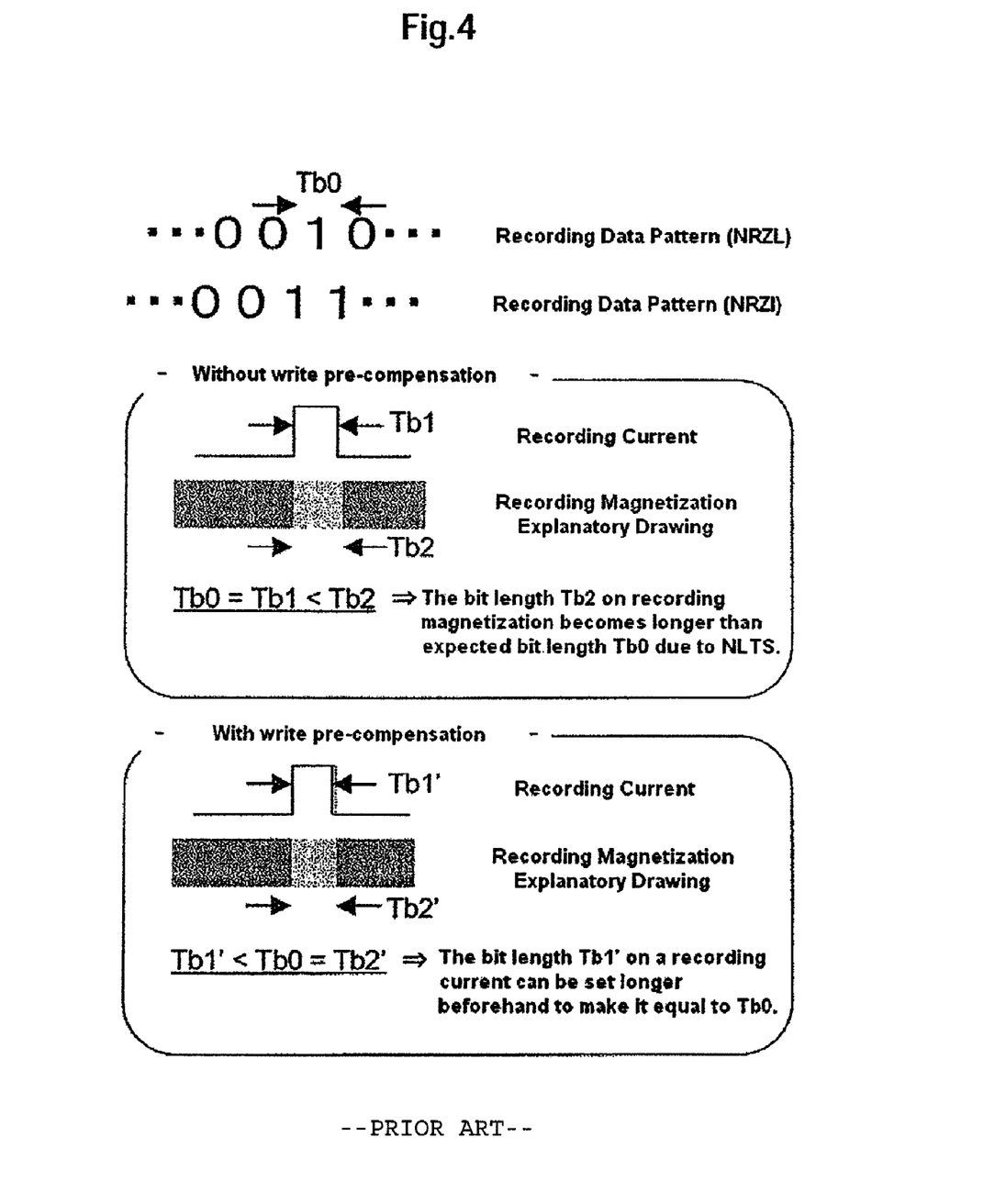
FIG. 4 is an explanatory diagram for showing the write pre-compensation method and its effect according to the perpendicular magnetic recording method.
Figure 5:
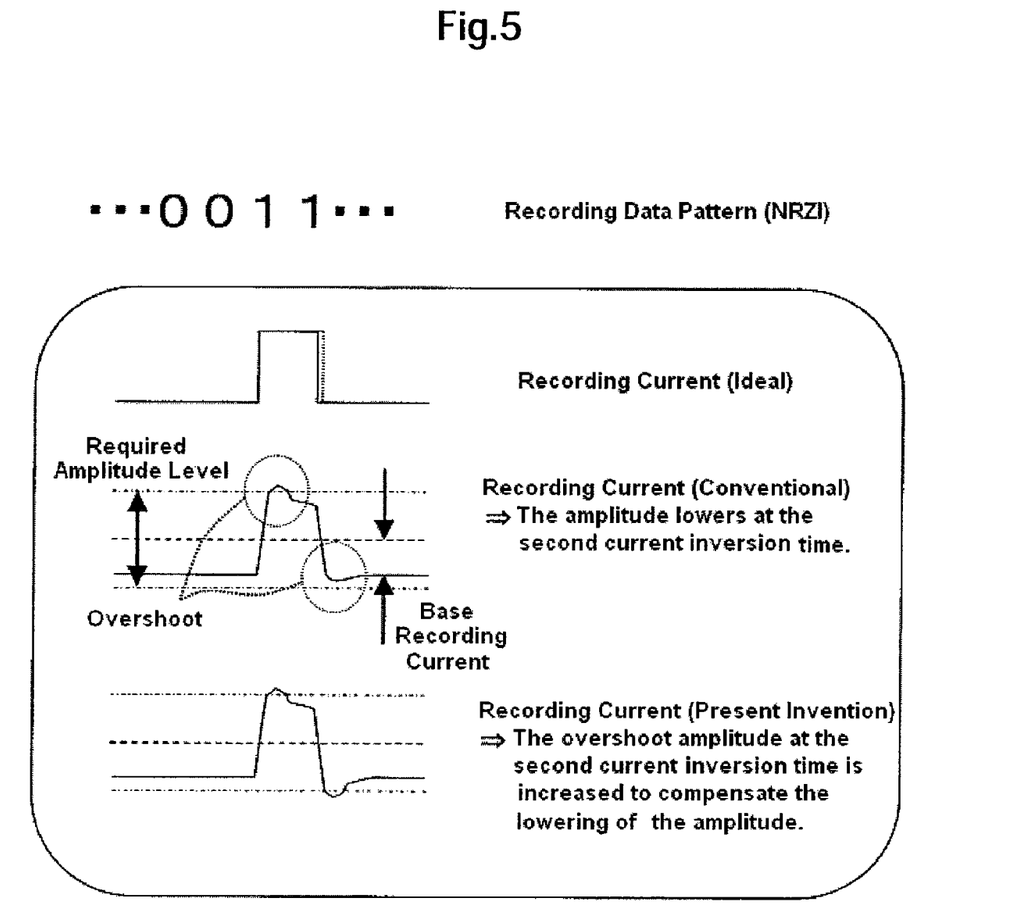
FIG. 5 is an explanatory diagram for describing a principle for describing how a current amplitude is lowered due to a rise of a recording current frequency and a method for improving the principle.

The NLTS is a non-linear distortion of a signal in the time axis direction and it affects significantly the error rate at the time of data reading if it is neglected. And the NLTS is a phenomenon to occur due to a demagnetizing field generated from the previous recording magnetization, so that the influence of the NLTS depends on the previous recording magnetization pattern, that is, a recording data pattern. At present, the NLTS is compensated with use of a method referred to as write pre-compensation, which shifts an inverting position of the subject recording current beforehand, thereby shifting the position of the magnetization transition to improve the error rate significantly at the time of data reading. Concretely, in the case of the longitudinal magnetic recording method, as shown in FIG. 3, to compensate the NLTS that occurs due to the adjacent magnetization transition, the inverting position of the recording current is shifted backward according to the amount of the NLTS. Also in the case of the perpendicular magnetic recording method, the write pre-compensation is considered to be an important technique, but the inverting position of the recording current is required to be shifted in the opposite direction (forward) as shown in FIG. 4, since the NLTS direction is inverted from that of the longitudinal magnetic recording method. Thus the minimum inverting interval of the recording current becomes shorter than the expected shortest bit length in some cases. This means that the recording current frequency can become higher than the expected (calculated from the shortest bit length) maximum frequency, although it is locally/temporarily.

Japanese Patent Publication No. 2004-30730 gives means for absorbing an individual difference of a general head pre-amplifier with respect to the recording frequency of a recording current response for any of the longitudinal magnetic recording method and the perpendicularly magnetic recording method. Japanese Patent Publication No. 2005-18833 proposes a method for recording information on a medium only with use of a pulse-like overshoot current in the end.

BRIEF SUMMARY OF THE INVENTION

Embodiments in accordance with the present invention reduce lowering of a recording current and a recording magnetic field that might occur upon execution of write pre-compensation for compensating the NLTS according to a perpendicular magnetic recording method. According to one embodiment of the present invention, the recording current overshoot is increased for recording a high NLTS recording data pattern. The read signal quality is improved, thereby a highly reliable magnetic disk can be provided.

DETAILED DESCRIPTION OF THE INVENTION

Mainly, because of the following two reasons, rising of the recording current frequency causes lowering of the recording current amplitude.

Generally, an electric line has frequency characteristics and its amplitude is lowered in high frequency bands. This is also true for a line FPC (Flexible Print Cable) for connecting a pre-amplifier that includes a recording current generation circuit provided in a magnetic disk drive to a write/read head; its amplitude is lowered due to a rise of the recording current frequency similarly.

Generally, output amplitude characteristics of a recording current generation (supply) circuit at a high frequency has a trade-off relationship with its cost and power consumption, so that some of the recording current generation circuits are limited by such a relationship and cannot obtain a desired amplitude easily in high frequencies.

Even when lowering of the recording current amplitude is a local/temporary one, the lowering causes lowering of the recording magnetic field intensity generated from the write sensor of the writing/read head. Upon such lowering of the recording magnetic field intensity, saturation recording on the recording layer of the medium comes to be insufficient, thereby causing degradation of the reading time signal quality (e.g., signal-to-noise ratio (SNR) and data error rate) and losing of the reliability of the magnetic disk drive.

Similarly, the reliability of the drive might also be lost due to a factor that depends on a recording data pattern other than the NLTS related one described above and affects the recording magnetic field.

As a means for solving the above described problem, there is also a method considered for increasing the recording current amplitude beforehand to compensate the lowering of the amplitude in high frequency bands. However, it is not preferable to keep an increased recording current amplitude in uniform, since it causes the power consumption to increase. In addition, it increases the magnetic field leakage from the recording head to the cross-track direction. As a result, the recording track is widened, thereby it might disturb achievement of a high recording density.

Under such circumstances, according to one embodiment of the present invention, for example, taking notice of a recording data pattern having a large NLTS, solves the above problem by increasing the amplitude of the recording current upon recording of such a data pattern. More concretely, embodiments of the present invention make an attempt to solve the above problem by increasing the amplitude of an overshoot current selected from the overshoot current and the base recording current that are recording current components, thereby suppressing an increase of both power consumption and recording track width. And concretely, upon writing a recording data pattern "00 ... 0011 ..." (NRZI notation) in which NLTS functions apparently due to the adjacent previous magnetization transition according to the perpendicular magnetic recording method, the recording current overshoot current amplitude corresponding to the second "1" can be increased to prevent lowering of the recording current amplitude, as well as lowering of the recording density to be affected by the recording current amplitude. The same method can also apply to other factors than the NLTS related one to suppress the fluctuation of the recording magnetic field intensity as long as those factors depends on recording data patterns.

According to embodiments of the present invention, therefore, it is expected that a highly reliable magnetic disk drive can be realized.

Hereunder, an embodiment of the present invention will be described.

Figure 6:
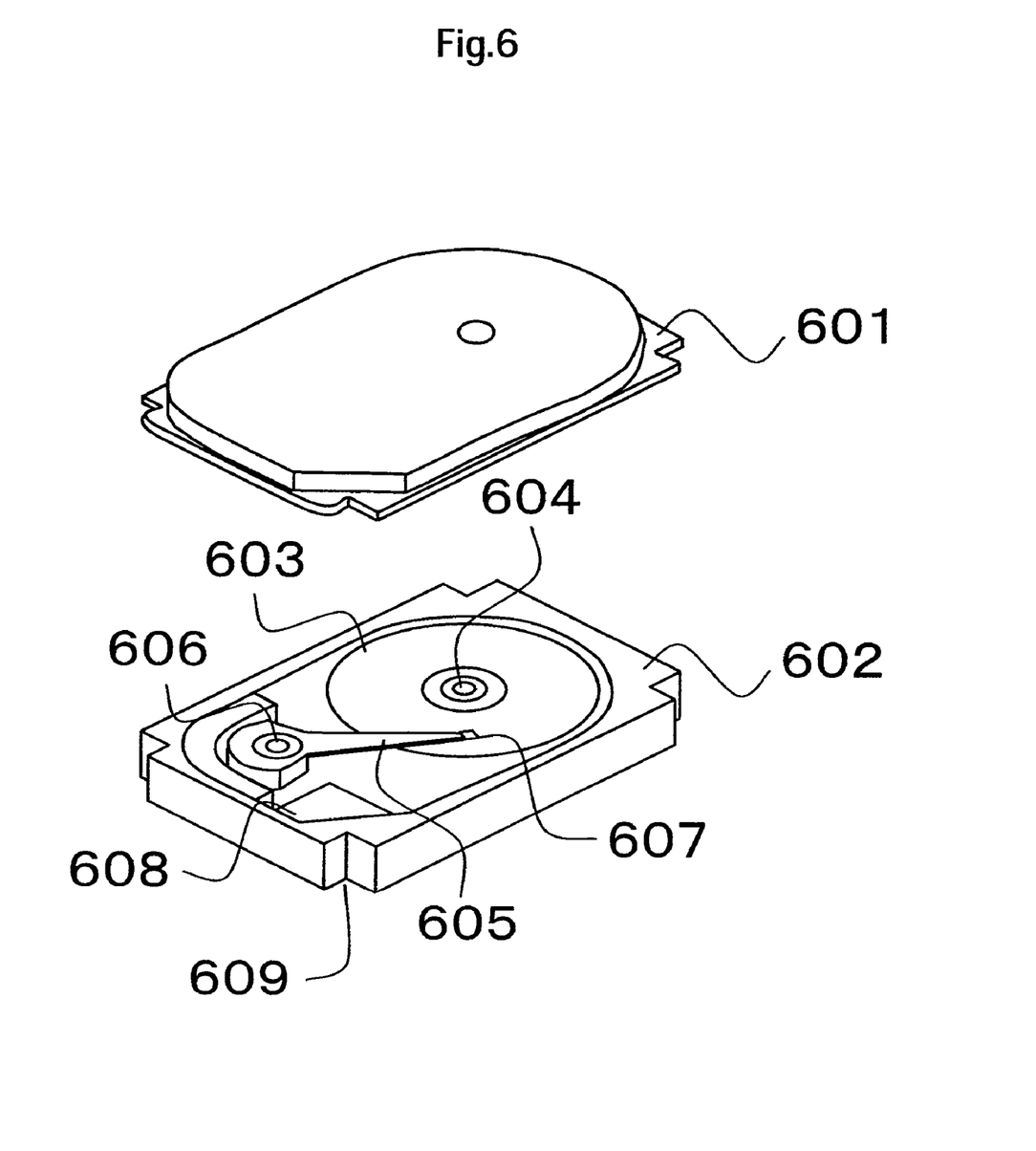
FIG. 6 is a bird's eye view for showing a configuration example of a general magnetic disk drive.

FIG. 6 shows a schematic diagram of a configuration of a general magnetic disk drive. In a housing 602 are incorporated a disk-like recording medium 603, a spindle motor 604 for turning the recording medium, and an actuator for moving a write/read head 607. At the back of the housing 602 is disposed a package board 609 on which an interface with such a host as a PC or the like, an HDC (Hard Disk Controller), an RW channel LSI, etc. are mounted. The top of the housing 602 is covered with an upper cover 601.

The actuator comprises an arm 605 that incorporates a head 607 and a voice coil motor 606 for moving the arm in the radial direction on the recording medium. Also in the housing 602 is disposed a circuit board 608 having a pre-amplifier circuit for generating a recording current at the time of information reading and amplifying signals at the time of reading therefrom. The pre-amplifier circuit is connected to the head 607 through an FPC and used to transfer signals at the time of writing/reading.

Figure 7:
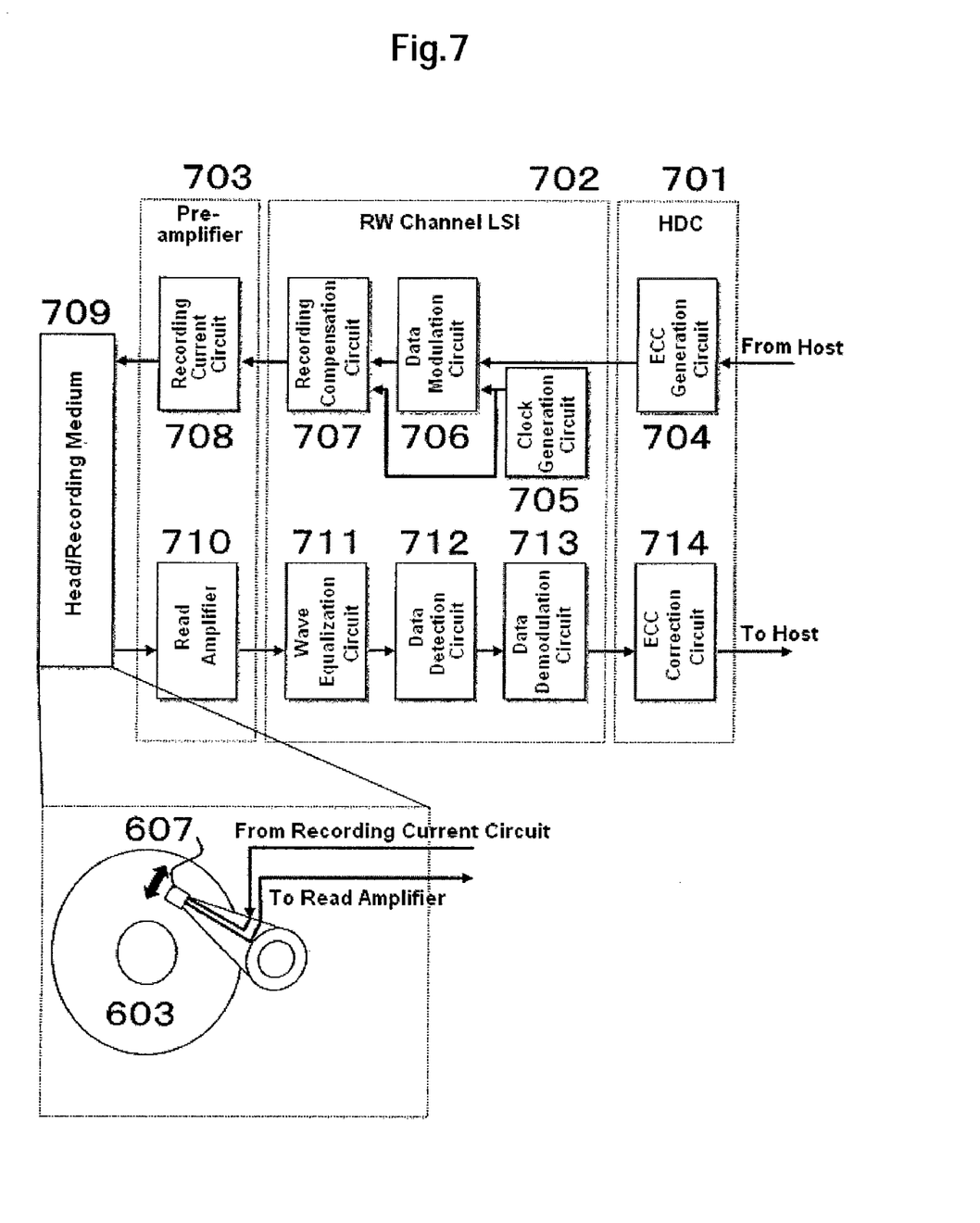
FIG. 7 is a block diagram of a data flow of the general magnetic disk drive.

FIG. 7 shows a schematic diagram of a data flow in a general magnetic disk drive. Recording data sent from a host is added an error correction code in an ECC (Error Correction Code) generation circuit 704 provided in the HDC 701. Then, data entered to the RW channel LSI 702 advances synchronously with a clock generated in a clock generation circuit 705. The data is then converted to a data string (recording data pattern) in a data modulation circuit 706 so that data errors are reduced at the time of reading and sent to a write re-compensation) circuit 707. A recording current generation circuit 708 provided in the pre-amplifier circuit 703 superimposes a rectangular wave-like base recording current onto a pulse-like overshoot current according to the received recording data pattern to generate a recording current, which is then supplied to a recording head (write element) of the write/read head 607 of the head/recording medium 609. The write head then writes the recording data converted to a change of a magnetic field by the write head on the recording medium 603. Data writing is thus completed in the processes as described above.

In the reading processes, the read head (read element) of the write/read head 607 reads a leakage magnetic field from the magnetization on the recording medium as a voltage change. The read waveform is sent to a wave equalization circuit 711 and a data detection circuit 712 provided in the RW channel SLI 702 through a read amplifier 710 provided in the pre-amplifier circuit 703. The combination of the wave equalization circuit and the data detection circuit is well known as a PRML circuit, which equalizes a read waveform to a waveform having desired characteristics through a filter, etc., then detects data in the maximum likelihood. The detected data is subjected to an inverted processing in the data demodulation circuit 713 and sent to an ECC correction circuit 714 for data error detection and data error correction and returned to the host.

Figure 8:
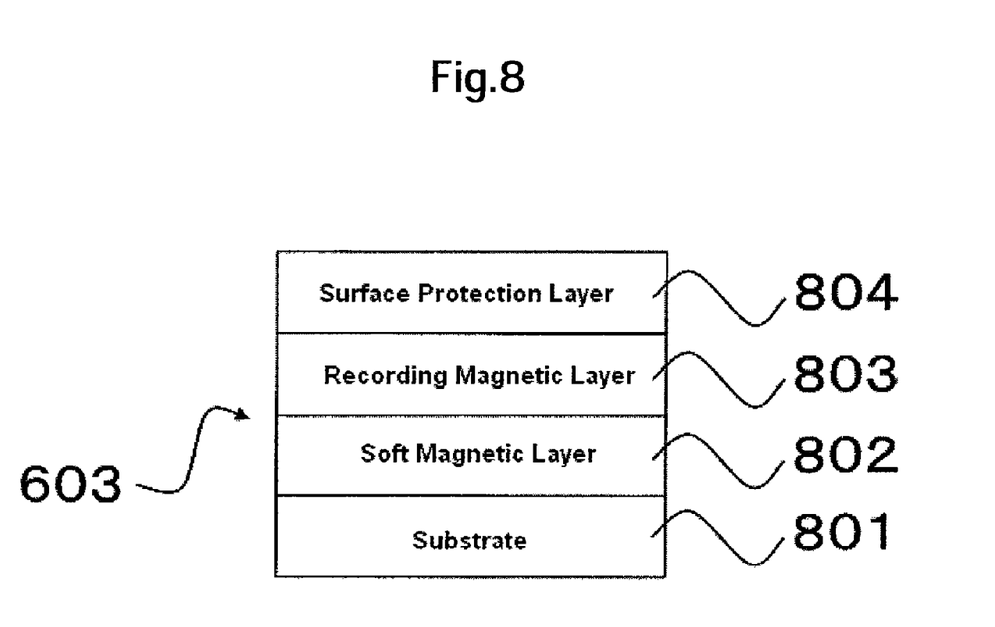
FIG. 8 is a vertical cross sectional diagram for showing a configuration example of a perpendicular magnetic recording medium.

FIG. 8 shows an example of a configuration of the perpendicular recording medium 603. Generally, the perpendicular magnetic recording medium 603 has a structure obtained by stacking a soft magnetic layer 802 made of CoTaZr or the like on a substrate 801 made of aluminum, then stacking a recording magnetic layer 803 and a surface protection layer 804 made of a CoCrPt system thereon respectively. The soft magnetic layer 802 and the recording magnetic layer 803 may not be formed with a single composition; each of those layers may be multilayered.

Figure 9:
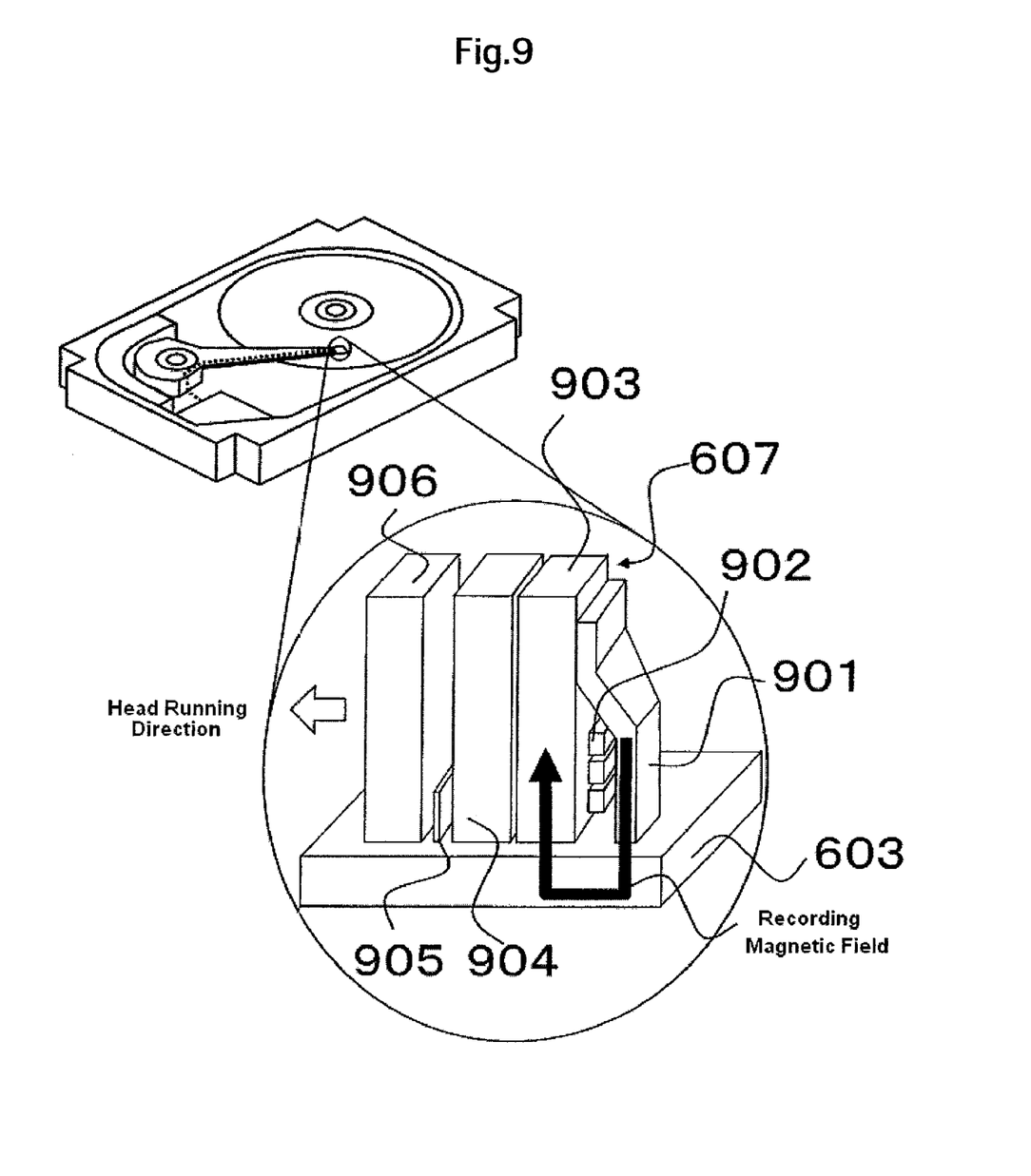
FIG. 9 is a bird's eye view of a configuration example of a write/read head.

FIG. 9 shows an example of the write/read head 607, which is an element for writing/reading information. The write/read head shown in FIG. 9 is a write/read head 607 having a single pole magnetic recording head often employed for the perpendicular magnetic recording method. A main pole 901 excited by an excitation coil 902 generates a magnetic field (recording magnetic field) at the time of writing and information is written in the recording magnetic layer of the perpendicular magnetic recording medium 603. Furthermore, the recording magnetic field is returned to an auxiliary pole 903 through the soft magnetic layer 802 to constitute a closed magnetic circuit.

At the time of reading, a magnetic field sensitive element such as an MR element 905 senses a magnetic flux leaked from the recording magnetic layer 803 of the perpendicular magnetic recording medium 603 to read the leakage magnetic flux as a voltage change. The MR shields 904 and 906 blocks the magnetic flux from regions other than a target region from which data is to be read to improve the sensitivity of the read head. The auxiliary pole 903 and the MR shield 904 may be united into one.

Hereunder, a description will be made for a write pre-compensation processing for NLTS compensation. The write pre-compensation processing is executed in a recording compensation circuit 707 provided in the RW channel LSI. As described above, because the NLTS depends on recording data patterns, an amount of the shifting for write pre-compensation also depends on recording data patterns. In case where the previous magnetization of n bits in the past affects the data bit $D_k$ that is about to be written as the NLTS, the circuit 707 monitors a bit string of $\{D_{k-n}, D_{k-n+1}, \ldots, D_{k-1}, D_{k-1}, D_k\}$ at each clock and the inverting position of the recording current is shifted in a direction for canceling the NLTS at that time, thereby realizing the write pre-compensation. Concretely, it is just required to have a reference table for describing an amount of write pre-compensation according to $2^{(n+1)}$ types of bit strings (assumed to be input bit strings) and shift the inverting position of the recording current just by an amount of write pre-compensation corresponding to an input bit string updated at each clock.

Figure 10:
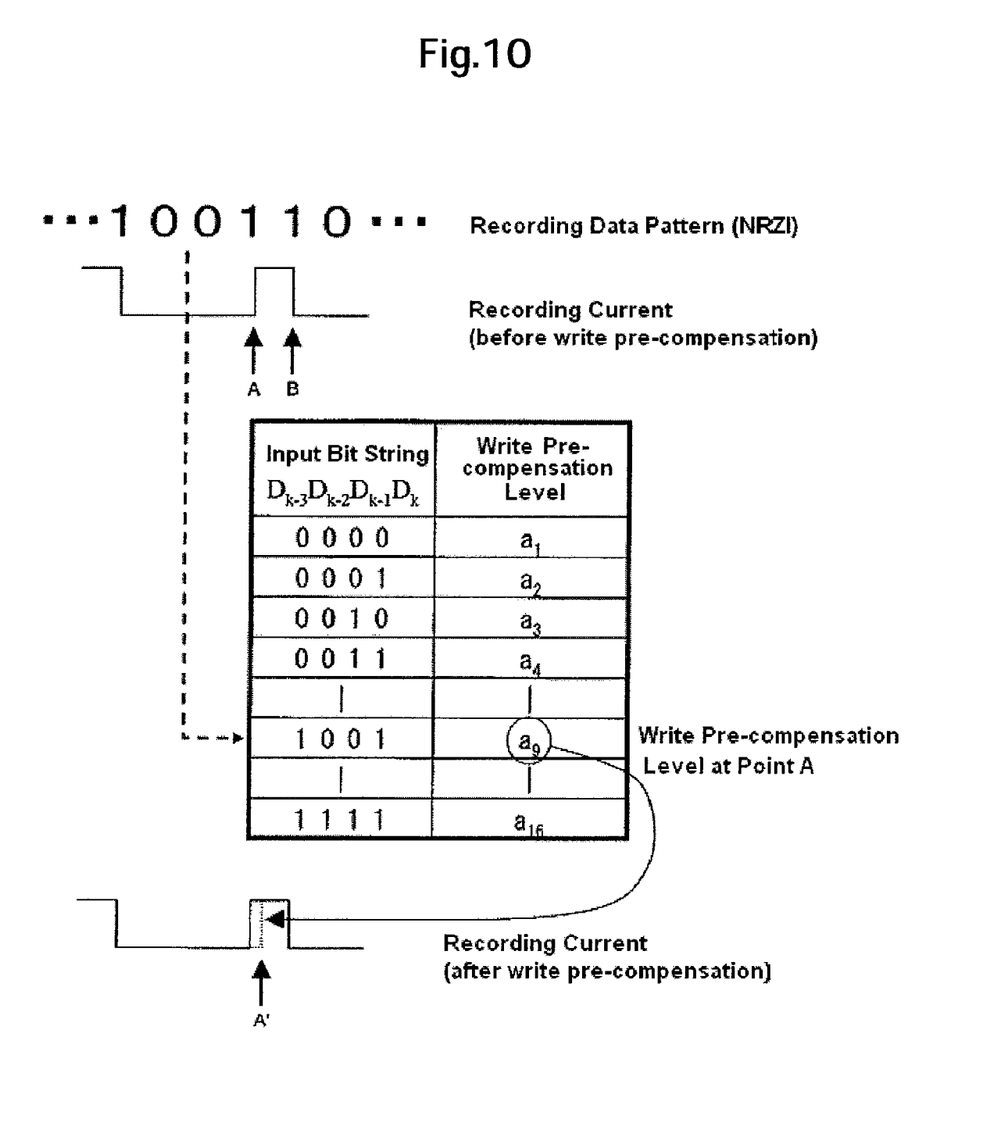
FIG. 10 is an explanatory diagram for describing a method for realizing a write pre-compensation method.

Next, an example shown in FIG. 10 will be described. In the case where the NLTS is affected by the previous magnetization of the three bits in the past, the amount of write pre-compensation at the transition denoted with a recording current A corresponding to a recording data pattern " . . . 100110 . . . " is obtained by searching the reference table according to an input of a data pattern "1001" of three bits in the past, which includes a recording bit corresponding to A and by obtaining the corresponding value $a_9$. Similarly, the amount of write pre-compensation at the transition denoted with B takes a value $a_4$ corresponding to a bit string "0011" of an input to the reference table. It is also possible that $D_k$ is inputted to a state represented by $\{D_{k-1}, D_{k-n+1}, \ldots, D_{k-1}\}$ instead of the reference table, the state is shifted to $\{D_{k-n+1}, \ldots, D_{k-1}, D_k\}$, and a state transition machine for outputting the amount of its corresponding write pre-compensation is used.

Figure 11:
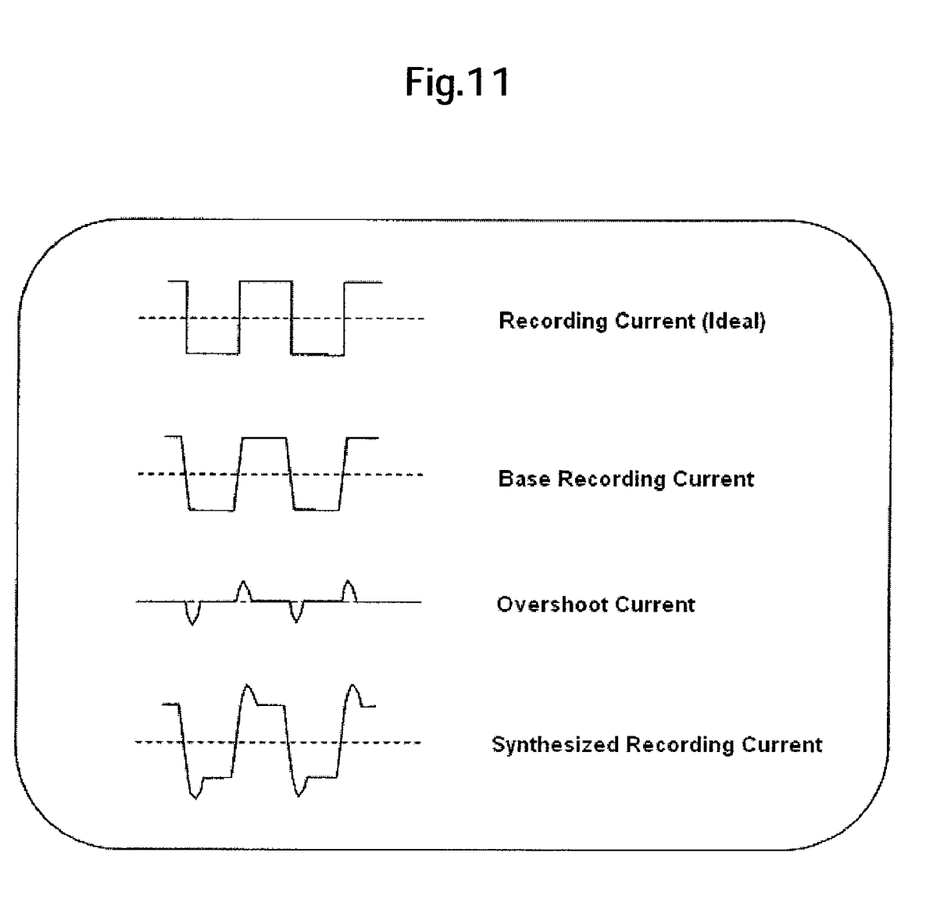
FIG. 11 is an explanatory diagram for describing a base recording current and an overshoot current as a recording current.

The pre-amplifier circuit amplifies a signal read by a read head and sends the signal to the RW channel LSI while the magnetic disk drive is reading. While the magnetic disk drive is writing, the pre-amplifier circuit excites the write head with a recording current and writes information in the recording magnetic layer of the perpendicular magnetic recording medium with a magnetic field generated at that time. Generally, a recording current, as shown in FIG. 11, takes a waveform obtained by superimposing a pulse-like overshoot current on the rising part of the rectangular wave-like base recording current. This waveform is adjusted finely according to the head in use, the medium characteristics, the circumferential speed, and the transfer rate, etc. The waveform is never adjusted during writing. Thus, the recording current amplitude might be lowered by a rise of the local/temporary recording frequency, caused by the NLTS compensation in the write pre-compensation as described above.

Embodiments of the present invention solve the above problem by adjusting the overshoot current amplitude level according to the subject recording data pattern during recording to vary the recording current amplitude and sets the overshoot current amplitude level higher than usually for a large NLTS amplitude level. The "usually" means an overshoot current amplitude level set for a pattern of which NLTS is not large. In the case of the perpendicular recording method, there are the following patterns (NRZI notation) of which NLTS is large respectively. Applying embodiments of the present invention to those patterns will achieve a significant effect. Examples of such patterns include:

(a) Pattern in which non-transition parts appear continuously for a while, then two magnetization transition parts appear consecutively;

(b) Pattern in which non-transition parts appear continuously for a while, then one magnetization transition part, one non-transition part, and one magnetization transition part appear respectively;

(c) Pattern in which non-transition parts of at least N bits appear continuously, then two magnetization transition parts appear consecutively N=an integer of 3 or over;

(d) Pattern in which non-transition parts of at least N bits appear continuously, then one magnetization transition part, one non-transition part, and one magnetization transition part appear respectively. N=an integer of 3 or over;

(e) Pattern in which non-transition parts of 3 or more bits appear continuously, then two magnetization transition parts appear consecutively;

(f) Pattern in which non-transition parts of 3 or more bits appear, then one magnetization transition part, one non-transition part, and one magnetization transition part appear respectively;

The following can be expected as a concrete example for realizing an object of embodiments of the present invention.

An RW channel LSI is provided with a function for monitoring recording data patterns and a function for obtaining an overshoot amplitude level according to each of those data patterns. A control signal related to each obtained overshoot amplitude level is sent to a recording current generation circuit of a pre-amplifier, thereby the recording current overshoot amplitude is changed dynamically.

Figure 12:
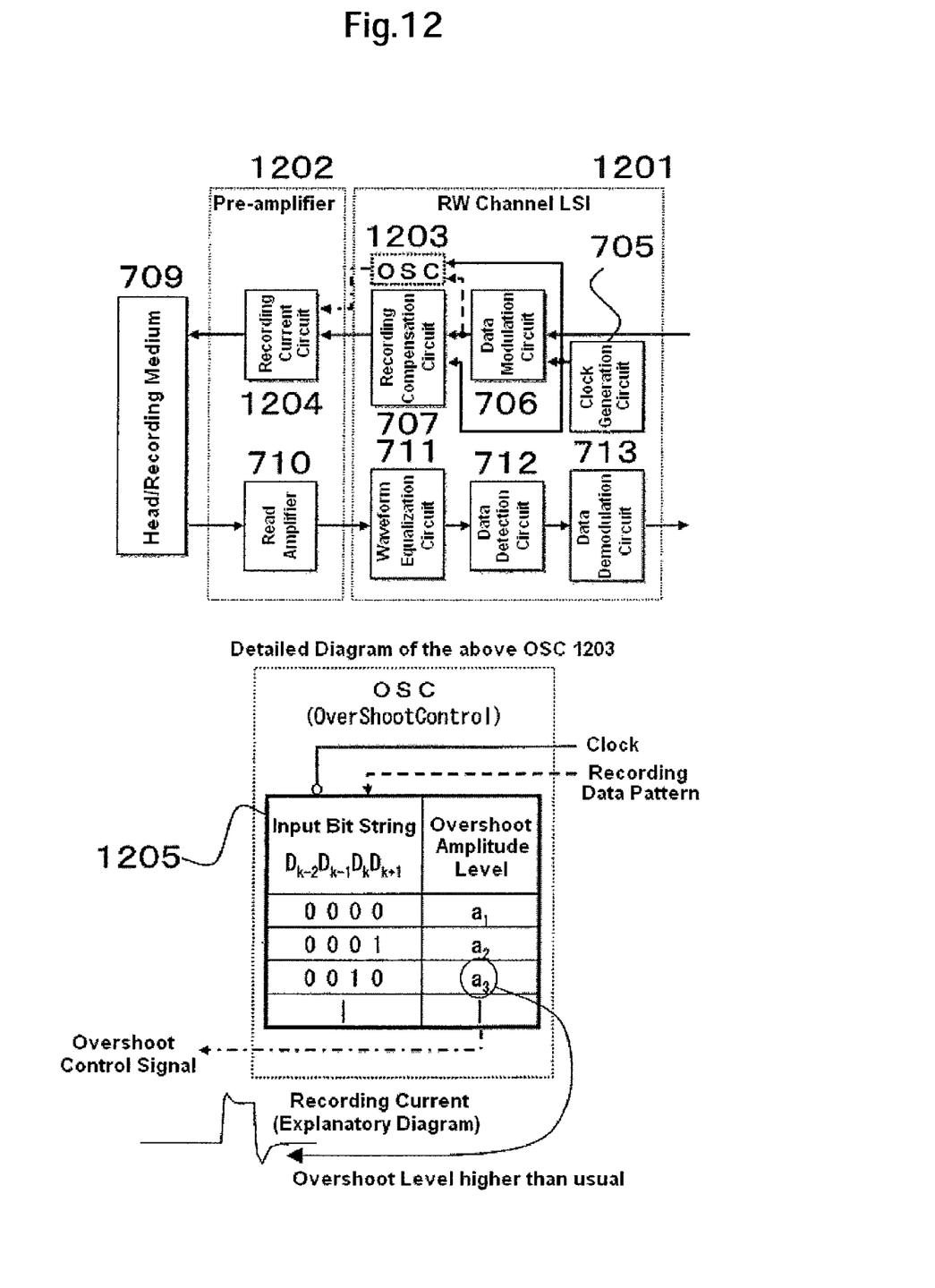
FIG. 12 is a block diagram of a magnetic disk drive according to an embodiment of the present invention and an explanatory diagram for describing an operation of an OSC.

FIG. 12 shows an example of this configuration. An RW channel LSI 1201 includes a circuit OSC (OverShoot Control) 1203 provided newly with functions for monitoring a recording data pattern at each clock and obtains an overshoot amplitude level according to the data pattern, then sending a control signal related to the overshoot amplitude level to the recording current generation circuit 1204 of the pre-amplitude 1202. The OSC 1203 inputs recording data patterns and clocks and outputs overshoot amplitude control signals. The OSC 1203 has a reference table 1205 that describes overshoot amplitude levels corresponding to $2^{(n+m+1)}$ types of bit strings (input bit strings) of $\{D_{k-n}, D_{k-n+1}, \ldots, D_{k-1}, D_k, D_{k+1}, \ldots D_{k+m-1}, D_{k+m}\}$ from which a total n+m+1 bit of the past n bits and the future m bits (n and m: integers of 0 or over) is cut out and outputs a control signal of an overshoot amplitude level corresponding to an input bit string updated at each clock. The recording current generation circuit 1204 of the pre-amplifier 1202 receives not only conventional recording data patterns, but also overshoot amplitude level control signals and varies the recording current overshoot amplitude at each clock, then sends the amplitude to the recording head dynamically. Instead of the reference table, the OSC 1203 may also use a state transition machine that inputs $D_{k+m}$ to a state represented by $\{D_{k-n}, D_{k-n+1}, \ldots, D_{k-1}, D_k, D_{k+1}, \ldots D_{k+m-1}\}$, thereby the state is shifted to $\{D_{k-n+1}, \ldots D_{k-n}, D_k, D_{k+1}, \ldots D_{k+m-1}, D_{k+m}\}$, so that the OSC 1203 outputs a control signal of the corresponding overshoot amplitude level. It is also possible to use the reference table or state transition machine according to embodiments of the present invention for obtaining/outputting overshoot amplitude levels as the reference table or state transition machine used for the write pre-compensation described above partially or wholly.

By providing such an OSC in the RW channel SLI and by enabling the OSC reference table and the reference table of recording compensation circuit provided in the RW channel SLI to be used commonly, the total power consumption and the circuit scale can be reduced.

According to another embodiment of the present invention, the pre-amplifier is provided with a function for monitoring recording data patterns and a function for obtaining an overshoot amplitude level according to each of those data patterns to enable each recording current overshoot amplitude to be varied dynamically.

Figure 13:
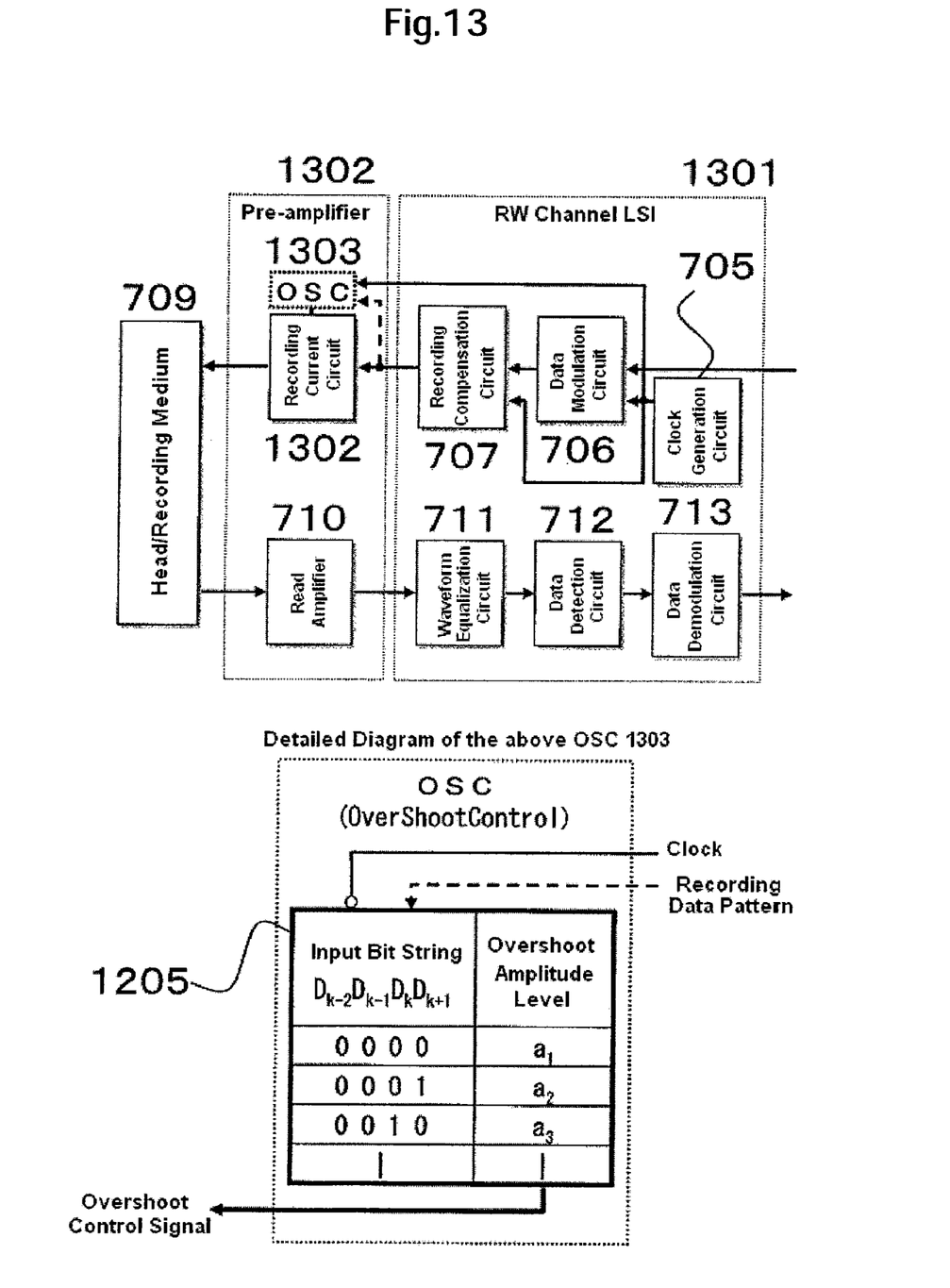
FIG. 13 is another block diagram of the magnetic disk drive according to an embodiment of the present invention and another explanatory diagram for describing the operation of the OSC.

FIG. 13 shows this configuration. An OSV 1303 is disposed in a pre-amplifier 1302. Because the OSC 1303 is required to synchronize with a clock, the pre-amplifier 1302 inputs conventional recording data patterns, as well as clock signals from an RW channel LSI 1301. Thus the RW channel LSI 1301 is required to output clock signals. The input/output configuration of the OSV 1303 may be the same as that in the first embodiment; the OSC 1303 can use a reference table method or state transition machine method as described in the first embodiment.

If the OSC is provided in the pre-amplifier, it will be able to shorten the routing of the overshoot control signals from the OSC to the recording current circuit. In cases, the present invention can also be realized just by modifying the pre-amplifier.

According to a third embodiment of the present invention, in addition to the RW channel LSI and the pre-amplifier, a processor is prepared to obtain/output overshoot amplitude levels and receive recording data patterns from the RW channel LSI and send control signals related to overshoot amplitude levels to the recording current generation circuit of the pre-amplifier, thereby varying each recording current overshoot amplitude dynamically.

Figure 14:
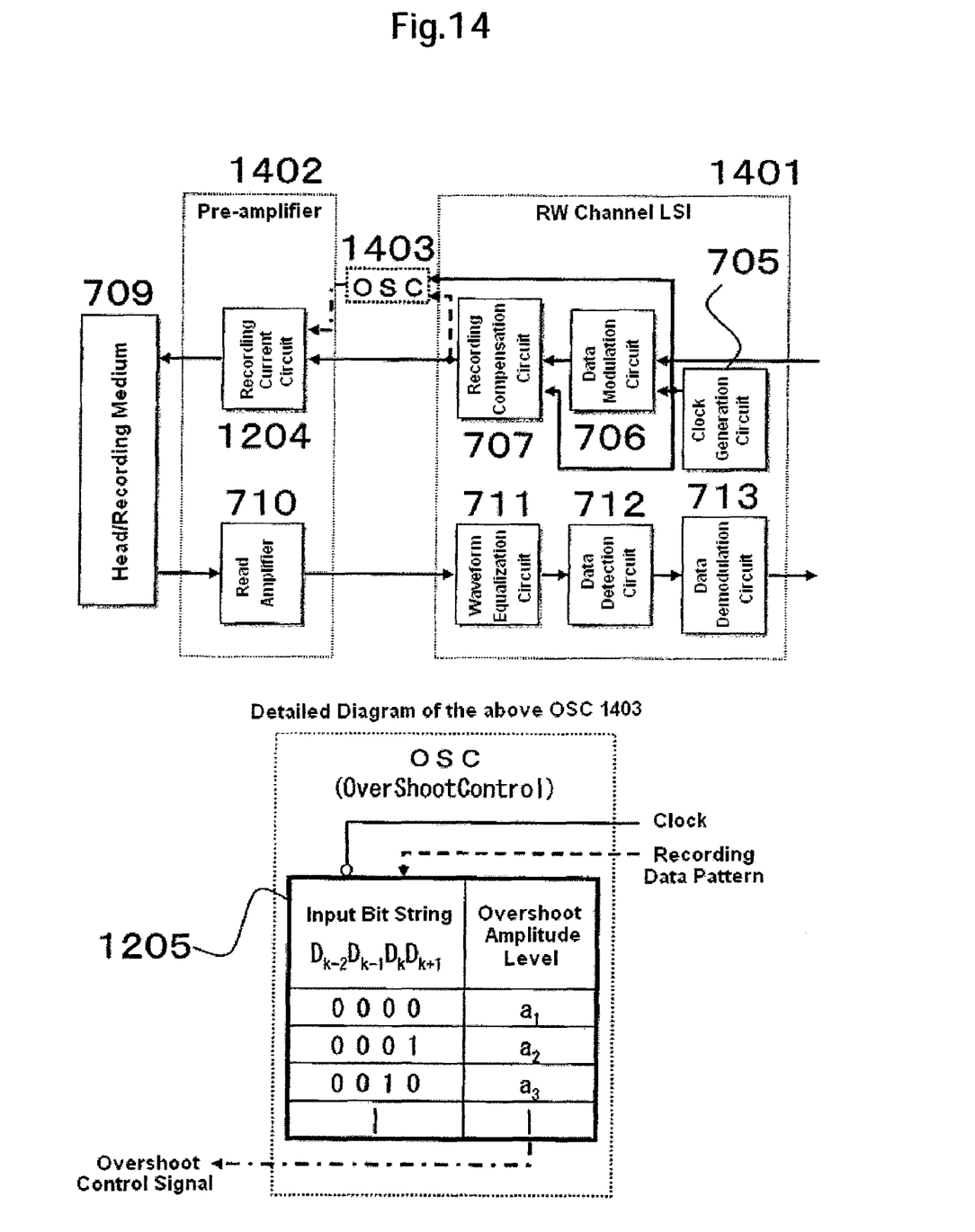
FIG. 14 is still another block diagram of the magnetic disk drive of the present invention and still another explanatory diagram for describing the operation of the OSC.

FIG. 14 shows this configuration. In this case, an OSC 1403 is disposed independently of an RW channel LSI 1401 and a pre-amplifier 1402. The RW channel LSI 1401 is required to have a function for outputting both recording data patterns and clock signals while the pre-amplifier 1402 is required to have a function for receiving both recording data patterns and overshoot amplitude control signals. The input/output configuration of the OSC 1403 may be the same as that in first embodiment and the concrete method for obtaining/outputting overshoot amplitude levels may use the reference table method or state transition machine as described in the first embodiment.

If the OSC is provided outside the RW channel LSI, modification of the existing RW channel LSI and pre-amplifier can be minimized.

By employing the configuration as described above and by enabling the recording current amplitude to be varied dynamically during writing, it is possible to avoid lowering of the recording magnetic field intensity that might occur due to a factor as described above, as well as degradation of the read signal quality to be caused by the lowering of the magnetic field intensity. Thus a highly reliable magnetic disk drive can be created.

What is claimed is:

1. A magnetic disk drive, comprising:
  a recording head;
  a perpendicular magnetic recording medium;
  a recording current generation circuit for generating a recording current for recording information on said perpendicular magnetic recording medium with use of said recording head; and
  a processor for analyzing a recording data pattern to obtain information of an overshoot amplitude level of said recording current and transferring said obtained information to said recording current generation circuit;
  wherein said recording current generation circuit generates an overshoot added recording current according to said overshoot amplitude level information and adjusts an amplitude of the overshoot current according to a subject recording data pattern during recording to vary the recording current amplitude; and
  wherein said overshoot amplitude level is set over a normal overshoot amplitude level for a recording data pattern in which at least N bits, where N: an integer of 3 or over, of non-transition parts are continued, then two magnetization transition parts appear consecutively.

2. The magnetic disk drive according to claim 1, wherein said processor obtains said information of said overshoot amplitude level synchronously with a bit clock during a recording operation and transfers said level information to said recording current generation circuit.

3. The magnetic disk drive according to claim 1, wherein said processor is included in a read/write (RW) channel.

4. The magnetic disk drive according to claim 1, wherein said processor is included in a pre-amplifier together with said recording current generation circuit.

5. The magnetic disk drive according to claim 1, wherein said processor has a reference table and inputs said recording data pattern and refers to its corresponding table to obtain said overshoot amplitude level information.

6. The magnetic disk drive according to claim 1, wherein said processor has a state transition machine and enables said recording data pattern to be inputted to said state transition machine and obtains said level information from an output of said state transition machine.

7. A magnetic disk drive, comprising:
  a recording head;
  a perpendicular magnetic recording medium;
  a recording current generation circuit for generating a recording current for recording information on said perpendicular magnetic recording medium with use of said recording head; and
  a processor for analyzing a recording data pattern to obtain overshoot amplitude level information of said recording current and transferring said obtained level information to said recording current generation circuit, wherein said recording current generation circuit generates an overshoot added recording current according to said overshoot amplitude level information and adjusts an amplitude of the overshoot current according to a subject recording data pattern during recording to vary the recording current amplitude; and wherein said overshoot amplitude level information is set over a normal overshoot amplitude level for a recording data pattern in which at least N bits, where N: an integer of 3 or over, of non-transition parts are continued, then one magnetization transition part, one non-transition part, and one magnetization part appear respectively.

8. The magnetic disk drive according to claim 7, wherein said processor obtains said overshoot amplitude level information synchronously with a bit clock during a recording operation and transfers said level information to said recording current generation circuit.

9. The magnetic disk drive according to claim 7, wherein said processor is included in a read/write (RW) channel.

10. The magnetic disk drive according to claim 7, wherein said processor is included in a pre-amplifier together with said recording current generation circuit.

11. The magnetic disk drive according to claim 7, wherein said processor has a table and inputs said recording data pattern and refers to its corresponding table to obtain said level information.

12. The magnetic disk drive according to claim 7, wherein said processor has a state transition machine and enables said recording data pattern to be inputted to said state transition machine and obtains said overshoot amplitude level information from an output of said state transition machine.

* * * * *